United States Patent [19]

Wilson et al.

[11] 4,343,985
[45] Aug. 10, 1982

[54] COUNTER TOP FOOD WARMER AND DISPLAY CASE

[75] Inventors: Robert G. Wilson, 10 Chisolm Trail, Greenville, S.C. 29607; Raymond W. Rogers, Greenville, S.C.

[73] Assignee: Robert G. Wilson, Mauldin, S.C.

[21] Appl. No.: 116,819

[22] Filed: Jan. 29, 1980

Related U.S. Application Data

[63] Continuation of Ser. No. 849,432, Nov. 7, 1977.

[51] Int. Cl.³ .............................................. H05B 1/00
[52] U.S. Cl. ................................... 219/214; 219/385; 219/362; 219/411
[58] Field of Search .............. 219/385, 386, 214, 405, 219/402, 403, 401, 440, 362, 411; 312/236; 99/467; 126/33, 281, 20, 20 A; 34/88

[56] References Cited

U.S. PATENT DOCUMENTS

| | | | |
|---|---|---|---|
| 692,516 | 2/1902 | Higgins | 126/20 |
| 788,678 | 5/1905 | Simpson | 126/281 |
| 1,239,641 | 9/1917 | Trescott | 126/20 |
| 1,800,863 | 4/1931 | Johnson | 219/214 |
| 1,943,575 | 1/1934 | Abendroth | 219/386 |
| 3,161,755 | 12/1964 | Tilus | 219/386 |
| 3,327,092 | 6/1967 | Wilson | 219/214 |
| 3,545,832 | 12/1970 | Levenbeck | 219/214 |
| 3,632,968 | 1/1972 | Wilson | 219/214 |
| 4,010,349 | 3/1977 | Lee | 312/236 |
| 4,035,608 | 7/1977 | Stromquist et al. | 219/214 |
| 4,074,108 | 2/1978 | King | 219/214 |

FOREIGN PATENT DOCUMENTS 605265 7/1948 United Kingdom ................ 219/401

*Primary Examiner*—Bernard Roskoski
*Attorney, Agent, or Firm*—Ralph Bailey

[57] ABSTRACT

A food warmer and display case which is especially adapted for use on the counter tops of restaurants and the like is illustrated wherein a glass enclosed area is provided for maintaining food such as cooked chicken for fast food service, in a heated humidified atmosphere. A lower housing is provided for supporting the glass closure and is adapted to provide for shallow containers for water to be heated by means positioned exteriorly of the water receptacles therebelow in such a manner that the heating means may be separately removed from the housing. A one-way reflective element covers a portion of the glass closure for diverting heat inwardly toward the food positioned within the food warmer yet permitting visual inspection thereof from the outside.

3 Claims, 2 Drawing Figures

COUNTER TOP FOOD WARMER AND DISPLAY CASE

BACKGROUND OF THE INVENTION

Food warmers of the type provided in many restaurants utilize deep wells carrying water below the food service tray for humidifying the food contained within the glass enclosures. Such food warmers have heating elements which are immersed within the wells. Food warmers utilized in fast food stores or restaurants are illustrated in U.S. Pat. Nos. 3,327,092 and 3,632,968. Food warmers of the type described have been relatively ineffective in providing adequate humidity and are totally unsuitable for use on the existing counter tops of fast food stores. It is desirable to utilize the existing tops in such establishments for the storage of utensils and accessories and even food items such as rolls and the like.

Accordingly, it is an important object of the present invention to provide an improved food warmer capable of use on the counter tops of fast food stores and the like.

Another important object of the invention is the provision of an improved food warmer wherein it is not necessary to position the heated units within the wells of water carried beneath food service trays.

Such heating elements have been of the type which, upon evaporation of all the water, burn out.

Still another important object of the invention is to provide a counter top food warmer having a relatively shallow base beneath the food service trays contained within a glass enclosed space with a removable insulated panel carrying heating elements positioned below and exteriorly of a container for water used for humidifying the atmosphere of the heated space above the food carrying trays.

Further important advantages include a simplified structure which is easy to clean and which conserves space while being convenient for the use of employees in dispensing fast food services.

BRIEF DESCRIPTION OF THE INVENTION

It has been found that a food warmer and display case especially adapted for use on service counter tops may be provided by utilizing a shallow housing for containing a water receptacle beneath food carrying trays and providing a heating means for heating the water upon an insulated lower portion within the housing.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
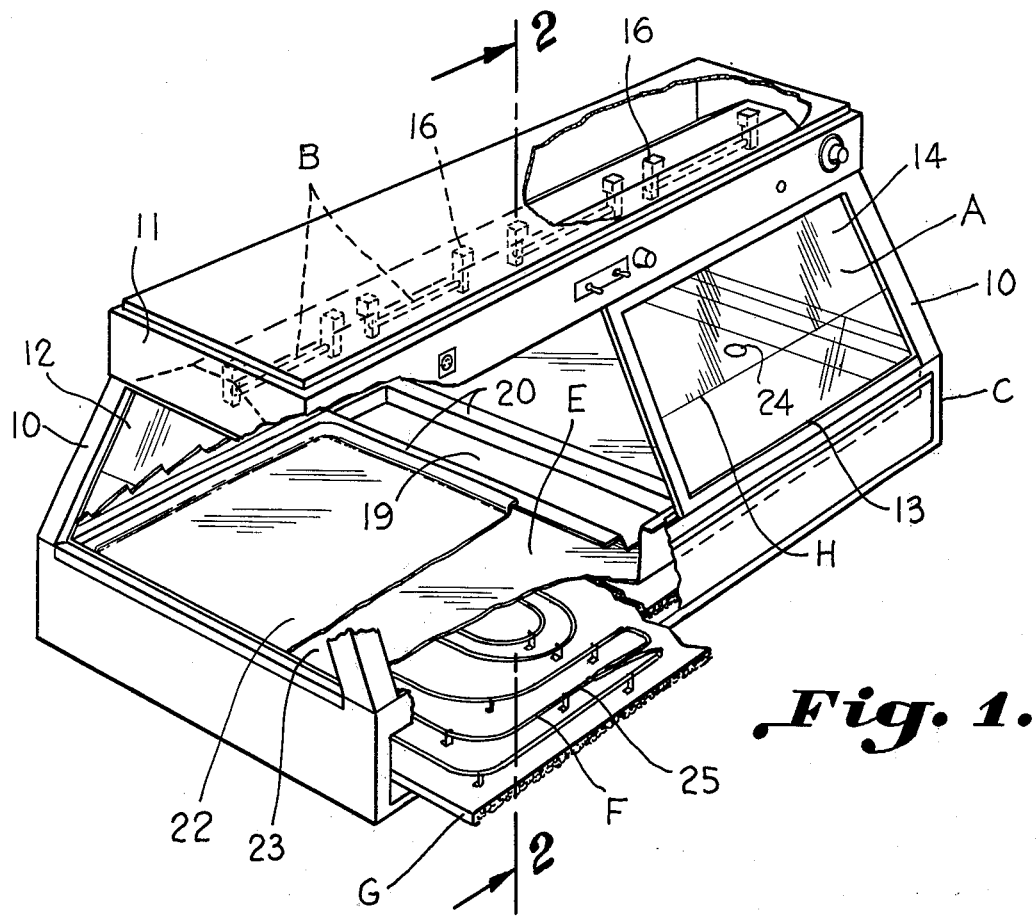
FIG. 1 is a perspective view illustrating a food warmer and display case constructed in accordance with the present invention.
Figure 2:
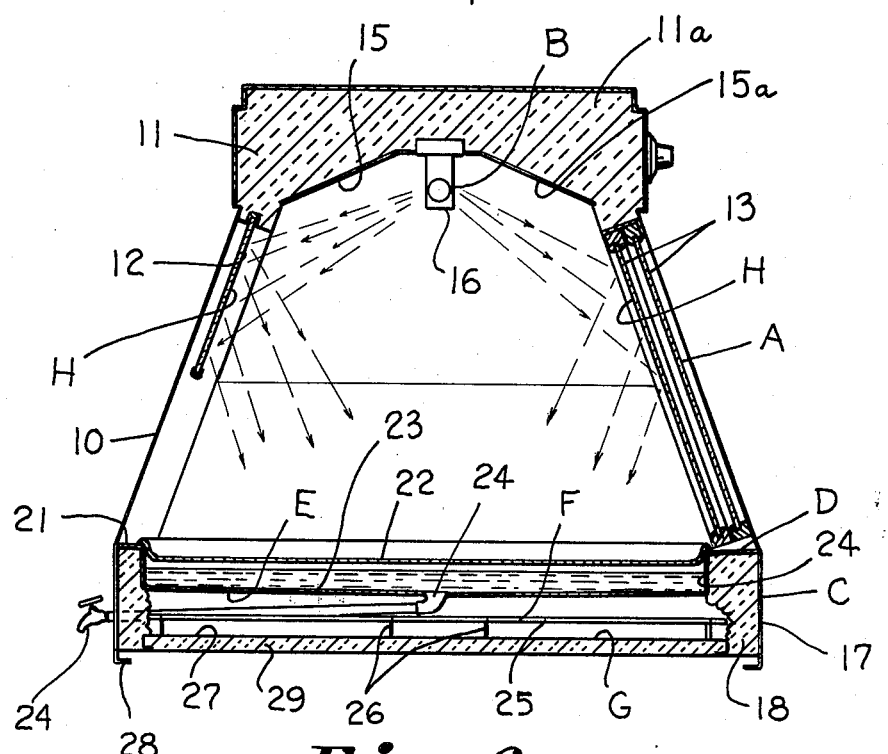
FIG. 2 is a transverse sectional elevation taken on the line 2—2 in FIG. 1.

The drawing illustrates a counter top food warmer and display case including a glass enclosure A. Heating means B are carried within an insulated upper portion of the enclosure. A lower housing C carries the glass enclosure thereon. Means D for positioning a food carrying tray as a bottom of said enclosure is carried adjacent an upper portion of the housing. A water carrying receptacle E is carried within the housing under the food carrying trays for humidifying the enclosure. A heating element F is carried in the housing below the water carrying receptacle for heating water carried therein; and a removable insulated base support G is carried within the housing below the heating element. A one-way reflective element H extends across an upper portion of the glass closure directing heat from the heating means inwardly of the oven.

The glass enclosure A includes supports 10 which are inclined inwardly towards an insulated upper portion thereof designated at 11. A glass 12 is carried on one side whereas glass doors 13 are provided on the other side.

Heating means B are provided in a cavity 15 within the upper insulated portion 11 and may be in the form of quartz tubes which are provided with supports 16 therefor. Preferably, the insulated portion 11 includes fiberglass insulation 11a and the cavity 15 provided therein includes inwardly converging surfaces 15a which help reflect the heat emanating from the quartz elements downwardly toward the food carried within the display case. The lower housing C is formed of a substantially rectangular sheet metal portion 17 which has fiberglass insulation 18 carried in side portions thereof. The lower housing C has an upper portion D for positioning food carrying trays in the bottom of the enclosure and includes opposed ledge surfaces 24a which, together with complementary ledge portions 21, support the food carrying trays 22. The water carrying receptacle E includes a plate 23 which is inclined toward a drain 24 for removing water therefrom. The partition or plate 23 extends immediately beneath the food carrying trays 22 and the sides of the receptacle defined thereby include adjoining walls 24a defining the lower housing C.

A heating element preferably in the form of several coils of calrod members 25, are supported by spaced brackets 26 which are, in turn, carried by the upper surfaces of a channel shaped member 27 which has downwardly and inwardly extending legs 27a on each side thereof so as to be slideably received within the lower housing C on integral bottom 28 of housing C extending between housing sides 17. A layer of fiberglass insulation 29 is provided therein for forming an insulated base as well as a carrier for the heating elements 25. An opening 17a is provided in the front of side 17 of lower housing C to facilitate the removal of the channel member 27 and heating element 25 carried thereon. A front plate 17b normally covers opening 17a.

The vertical height of the glass enclosure A is approximately two times the vertical height of the lower hosuing C. The lower housing C is formed in any well known manner such as by bending a continuous sheet of sheet metal or otherwise forming an integral structure. The structure is illustrated as including bottom 28, walls 17, ledge portion 21, opposed ledge surfaces 24a and the water carrying plate 23. Thus, a counter top food warmer with a shallow base is provided with consequent maximization of food display.

A one-way reflective element H is illustrated as being carried by an upper portion of all of the glass surfaces described above and provide visibility from the outside but act as a reflective surface for heat within the oven directing inwardly toward the contents thereof.

While a preferred embodiment of the invention has been described using specific terms, such description is for illustrative purposes only, and it is to be understood that changes and variations may be made without departing from the spirit or scope of the following claims.

What is claimed is:

1. A counter top food warmer and display case comprising:
   a glass enclosure including a display window;
   heating means carried within an insulated upper portion of said enclosure;
   a compact lower housing carrying said glass enclosure thereon;
   said lower housing including spaced end walls, front and back side walls, and a bottom wall defining a housing structure having an open interior;
   opposing ledge means integral with said side walls of said lower housing defining an upper portion of said lower housing;
   a water carrying receptacle contiguous with said opposing ledge means of said housing coextending generally across said open interior for humidifying said enclosure;
   a food carrying tray means extending between and carried by said opposing ledge means above said water carrying receptacle;
   said tray means forming a bottom of said glass enclosure adjacent an upper portion of said housing;
   a heating element disposed in said housing below said water carrying receptacle and closely adjacent thereto for heating water carried therein;
   an insulated base carried on the bottom wall of said housing, said heating element being carried on said insulated base affording protective placement of said food warmer on the surface of an associated counter top;
   said lower housing providing a compact low profile structure for housing said food tray means, water receptacle means, heating element, and insulated base in a closely stacked configuration; and
   said glass enclosure having a height at least twice that of said compact lower housing;
   whereby said food warmer can be placed on a counter top utilizing a minimum amount of space while affording a maximum exposure of the interior of said food warmer.

2. The structure set forth in claim 1, including a one-way reflective element extending across an upper portion of said glass enclosure opposite said heating means directing heat from said heating means inwardly of said oven.

3. The structure set forth in claim 1, wherein said insulated base and said heating element are removably carried within said housing.

* * * * *